United States Patent
Aggarwal et al.

(10) Patent No.: US 7,933,936 B2
(45) Date of Patent: Apr. 26, 2011

(54) METHOD AND SYSTEM FOR AUTOMATIC MANAGEMENT OF STORAGE SPACE (75) Inventors: Himanshu Aggarwal, Cary, NC (US); Eric Hamilton, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 273 days.

(21) Appl. No.: 11/238,882

(22) Filed: Sep. 28, 2005

(65) Prior Publication Data

US 2006/0282485 A1    Dec. 14, 2006

(30) Foreign Application Priority Data

Jun. 10, 2005   (IN) .............................. 712/CHE/2005

(51) Int. Cl.
G06F 7/00 (2006.01)

(52) U.S. Cl. ....................................................... 707/812
(58) Field of Classification Search ................... 707/206, 707/812
See application file for complete search history.

(56) References Cited

U.S. PATENT DOCUMENTS

| | | | |
|---|---|---|---|
| 6,189,033 B1 | 2/2001 | Jin et al. | |
| 6,801,992 B2 | 10/2004 | Gajjar et al. | |
| 6,880,062 B1 | 4/2005 | Ibrahim et al. | |
| 6,920,555 B1 | 7/2005 | Peters et al. | |
| 6,957,008 B1 | 10/2005 | Yasui | |
| 7,016,948 B1 | 3/2006 | Yildiz | |
| 7,089,395 B2 | 8/2006 | Jacobson et al. | |
| 7,115,919 B2 | 10/2006 | Kodama | |
| 7,165,156 B1 | 1/2007 | Cameron et al. | |
| 7,213,124 B2 | 5/2007 | Serizawa et al. | |
| 7,237,080 B2 | 6/2007 | Green et al. | |
| 7,243,197 B2 | 7/2007 | Yamagami | |
| 7,246,211 B1 | 7/2007 | Beloussov et al. | |
| 7,257,606 B2 | 8/2007 | Kapoor et al. | |
| 2002/0156987 A1 | 10/2002 | Gajjar et al. | |
| 2002/0188711 A1 | 12/2002 | Meyer et al. | |
| 2003/0037127 A1 | 2/2003 | Shah et al. | |
| 2004/0068636 A1 | 4/2004 | Jacobson et al. | |
| 2005/0027754 A1 | 2/2005 | Gajjar et al. | |
| 2005/0055603 A1* | 3/2005 | Soran et al. ........................ 714/7 |
| 2005/0246401 A1 | 11/2005 | Edwards et al. | |
| 2006/0277385 A1 | 12/2006 | Von Praun et al. | |
| 2006/0282627 A1 | 12/2006 | Aggarwal et al. | |

* cited by examiner

Primary Examiner — Etienne P LeRoux
Assistant Examiner — Ajith Jacob
(74) Attorney, Agent, or Firm — Blakely, Sokoloff, Taylor & Zafman LLP (57) ABSTRACT

A system and method are provided to manage storage space. The method comprises detecting a free storage space threshold condition for a storage volume and automatically applying a space management technique to achieve a free storage space threshold condition. Space management techniques comprise deleting selected backup data (e.g., persistent consistency point images) and automatically increasing the size of the storage volume.

18 Claims, 5 Drawing Sheets

METHOD AND SYSTEM FOR AUTOMATIC MANAGEMENT OF STORAGE SPACE

RELATED APPLICATIONS

The present patent application claims the priority benefit of the filing date of Indian Application No. 712/che/2005 filed Jun. 10, 2005, which is incorporated herein by reference.

FIELD OF THE INVENTION

At least one embodiment of the present invention pertains to storage systems and, more particularly to management of storage space

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. Storage of information on the disk array is preferably implemented as one or more storage "volumes" of physical disks, defining an overall logical arrangement of disk space.

The storage operating system of the storage system may implement a high-level module, such as a file system, to logically organize the information stored on the disks as a hierarchical structure of directories, files and blocks. A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks.

Because creation of snapshots results in additional space consumption, a storage system that supports snapshots may run out of space even though the total size of user-created data does not amount to the total available storage space. If a volume is full, writes start to fail even when the system is up and running, thereby causing downtime.

Some existing systems implement a technique of space reservations, where a storage system administrator is permitted to set a fractional reserve percentage for an overwrite block reserve. Such space reservation is based on a theoretical amount of space required to completely overwrite each block stored in a PCPI, i.e. to have complete divergence between the active file system and a PCPI. Where space reservations are implemented, it is not always possible to make an exact prediction of how much additional space need to be reserved. When too little space is reserved, the system may run out of space causing write failures. On the other hand, where too much space is reserved, a considerable amount of space may remain unused, thereby resulting in wasted storage server space capacity.

Existing systems do not provide an automated mechanism to increase storage space available to users by reclaiming space consumed by snapshot data or by utilizing some other automatic mechanism.

SUMMARY

A system and method are provided to manage storage space in a storage system. The method comprises detecting a free storage space threshold condition for a storage volume and automatically applying a space management technique to achieve a free storage space threshold condition. Space management techniques comprise deleting selected backup data (e.g., persistent consistency point images) and automatically increasing the size of the storage volume.

Other aspects of the invention will be apparent from the accompanying figures and from the detailed description that follows.

BRIEF DESCRIPTION OF THE DRAWINGS

One or more embodiments of the present invention are illustrated by way of example and not limited to the figures of the accompanying drawings, in which like references indicate similar elements and in which.

DETAILED DESCRIPTION

A method and system are provided to manage storage space. In one embodiment, a storage operating system may be configured to allow a storage administrator to set up policy for automatically reclaiming space consumed by backup data (e.g., snapshots or some other type of backup images). An arrangement for automatically reclaiming space consumed by backup data may be termed an autodelete. In another embodiment, in a storage system that utilizes flexible volumes, an alternative or an additional policy may be set for automatically increasing available storage space by growing flexible volumes. The technique for automatically modifying the size of a volume may be termed an autosize. A flexible or "virtual" volume (vvol) is a volume that is contained within a file (i.e., a "container" file), where the virtual block number (vbn) space of the virtual volume is sized to the container file. The size of the vvol is determined by the number of blocks it can use, rather than the size of the container file, which allows for flexible sizing of a flexible volume. Flexible (virtual) volumes are described in detail in U.S. patent applications Ser. No. 10/836,817 titled, Extension of Write Anywhere File System Layout, filed Apr. 30, 2004, which is hereby incorporated by reference.

Autodelete may be triggered when a predetermined threshold for space availability is reached. For example, an administrator may specify that autodelete is to be triggered when a volume is 98% full. Conversely, a target free space threshold may be specified such that the selected backup data (e.g., snapshots) is being deleted only until a particular comfort level in free space is reached (e.g., when free space in a volume reaches 20%). In some embodiments, autodelete may be configured to delete snapshots according to predetermined criteria (e.g., the time of snapshot creation). Criteria specified by an administrator may be termed "user set policies." In one embodiment, a storage operating system continuously monitors a volume for the user set policies and actively deletes snapshots when the triggers are about to be hit.

Another illustrative space management technique, autosize functionality, is aimed at enabling users (such as administrators) to configure a storage operating system to automatically grow a flexible volume to increase the available space for data inside the volume. Administrators may be permitted to define policy to specify how much a volume can grow, as well as define thresholds to trigger automatic growing of a volume. In one embodiment, a storage operating system continuously monitors storage volumes for space management policies set by an administrator. If an autosize policy is detected with respect to a storage volume, the storage operating system actively grows the volume when a trigger (e.g., an "almost out of space" trigger) is hit.

In some embodiments, both autodelete and autosize functionalities may be enabled for a particular storage volume. The operating system may be configured to invoke first autodelete or autosize according to user-specified preference or a predetermined default setting. Thus, when a free storage space threshold for the particular volume is detected and autosize mechanism is the default space management technique, autosize procedure is attempted first. Conversely, if autodelete mechanism is the default space management technique, autodelete procedure is commenced first. If the default space management technique fails, the other technique may be attempted next. In one embodiment, the administrator may be permitted to configure the storage operating system to attempt a particular technique (either autosize or autodelete) first.

Utilizing autodelete and autosize storage space management techniques may result in decreasing user downtime, at the same time increasing space efficiency (e.g., percentage of disk space used at any given time).

Figure 1:
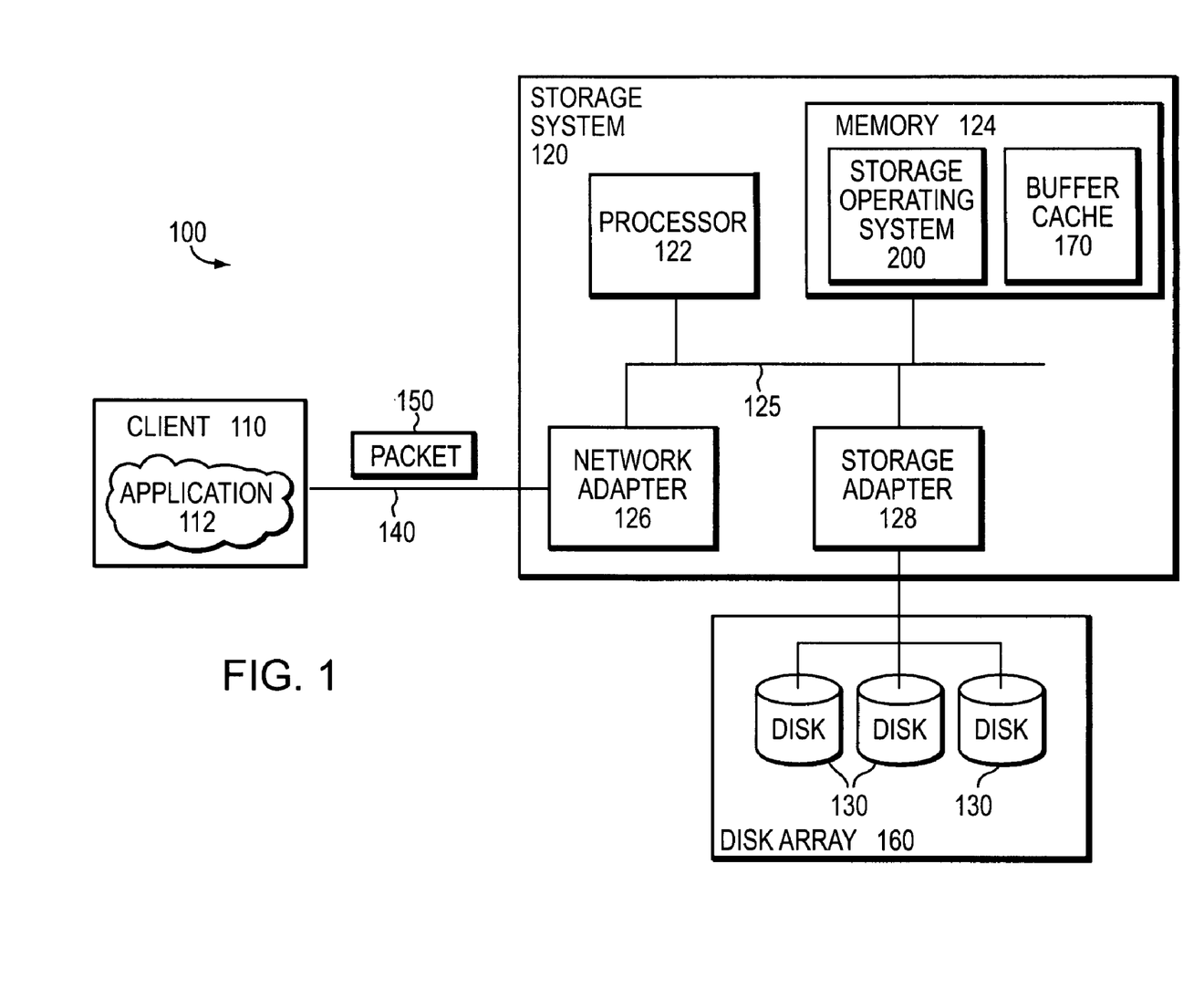
FIG. 1 is a schematic block diagram of an environment including a storage system that may be used with one embodiment of the present invention.

FIG. 1 is a schematic block diagram of an environment 100 including a storage system 120 that may be advantageously used with one embodiment of the present invention. The storage system provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing certain data structures. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 may be implemented as one or more storage "volumes" that comprise a collection of physical storage disks 130 cooperating to define an overall logical arrangement of vbn space on the volume(s). Each logical volume is generally, although not necessarily, associated with its own file system. The disks within a logical volume/file system are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it will be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as a set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (LUNs).

Figure 2:
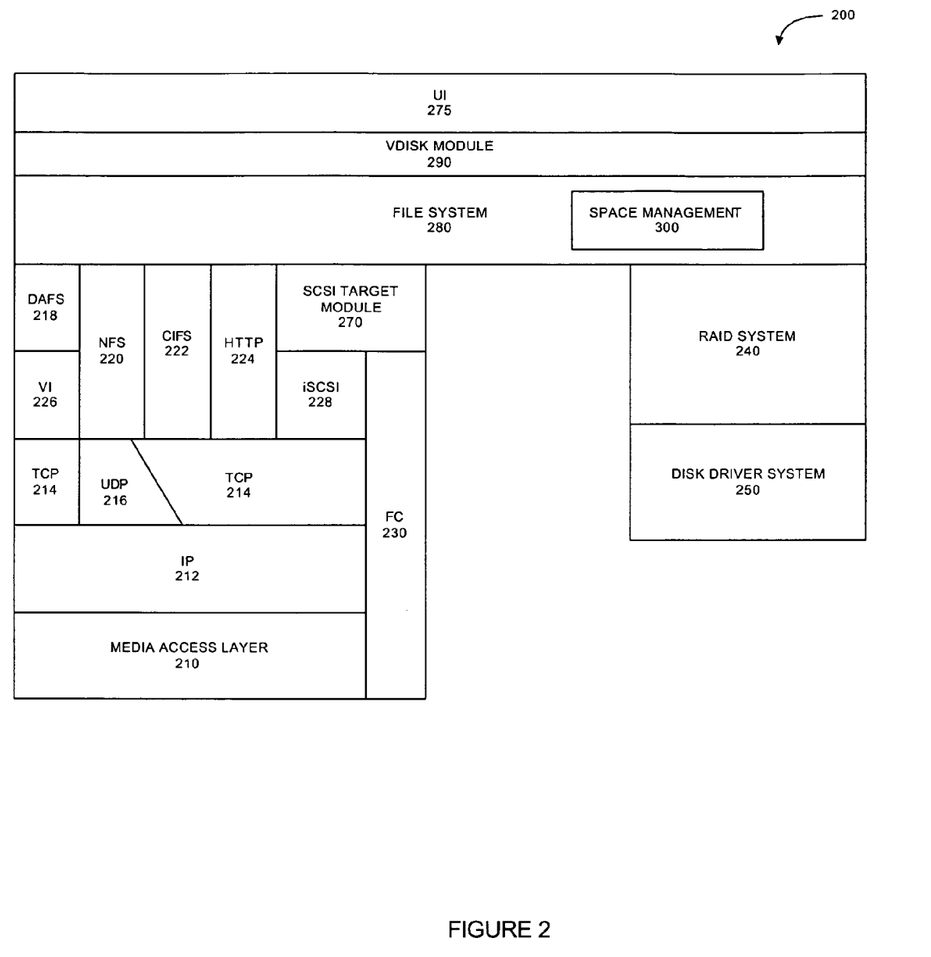
FIG. 2 is a schematic block diagram of a storage operating system that may be used with one embodiment of the present invention.

FIG. 2 is a schematic block diagram of the storage operating system 200 that may be advantageously used with one embodiment of the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A virtual interface (VI) layer 226 implements the VI architecture to provide direct access transport (DAT) capabilities, such as remote direct memory access (RDMA), as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (such as a system administrator) issuing commands to the storage system. The SCSI target module 270 is disposed to provide a translation layer of the virtualization system between the block (LUN) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write anywhere file system having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Figure 3:
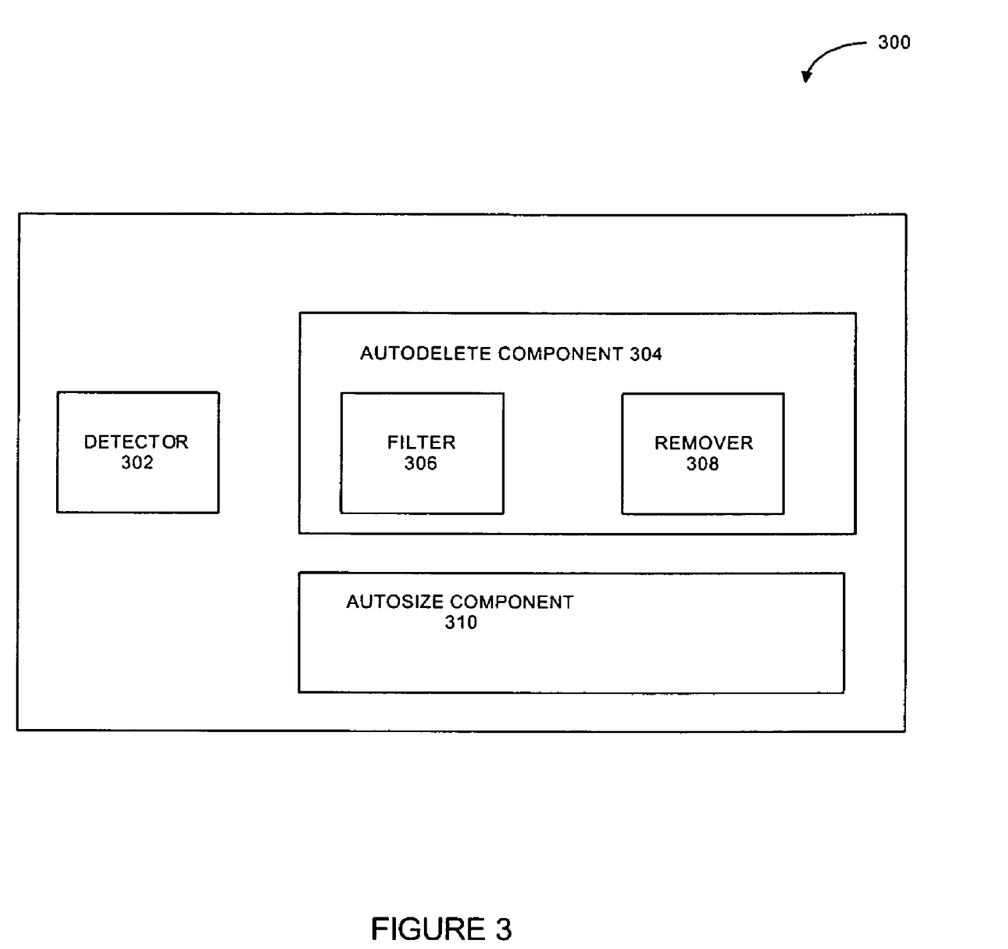
FIG. 3 is a schematic block diagram of a space management component, according to one embodiment of the present invention.

In one embodiment, the file system 280 includes a space management component 300. The space management process 300 may implement autosize and autodelete approaches to storage space management. An administrator may enable autodelete and autosize mechanisms utilizing associated commands that may be provided, for example, with command line interface (CLI) of a storage server.

The space management component 300, illustrated in FIG. 3, in one embodiment, includes a detector 302 to detect a condition that triggers a space management mechanism, an autodelete component 304, and an autosize component 310. The autodelete component 304 comprises, in one embodiment, a filter 306 to identify data that may be deleted by autodelete and data that should not be deleted by autodelete.

The filter 306 may also be responsible for determining the order in which data that is candidate for autodelete is examined. A remover 308 is responsible for deleting data marked for deletion by the filter 306.

Autodelete allows snapshots associated the volume to be automatically deleted. This approach may be useful when a volume is about to run out of available space and deleting snapshots can recover space for current writes to the volume. In one embodiment, autodelete is disabled by default so that an administrator needs to explicitly enable autodelete, e.g., utilizing an associated CLI command via a management console connected to the storage server. The autodelete policy may be set on a per volume basis.

In one embodiment, the snapshots in a volume are deleted in accordance with a policy selected by a user (e.g., an administrator), e.g., utilizing a variety of CLI commands with associated options (e.g., utilizing remote management technology or a client software having a web based GUI). An administrator may specify whether a particular snapshot or a snapshot in a particular condition is permitted to be deleted by autodelete. This option may be described as the level of commitment on the part of the user to allow autodelete. The higher the level of commitment is, the fewer conditions can prevent autodelete of particular snapshots. For example, an administrator may choose a setting where only those snapshots can be deleted by autodelete that are not locked by data protection or data backing utilities (a "try" level of commitment). Data protection utilities may include a utility that mirrors snapshots to different locations or transfers snapshots to another storage location such as a tape. Data backing utilities may include a cloning technique where a writable copy of a "parent" snapshot is generated. "Locking" refers to functionality provided, for example, with the mirroring and cloning tools to prevent users from deleting a "parent" snapshot or a snapshot that is in the process of being transferred to another destination.

A setting where only those snapshots that are not locked by data backing functionalities can be deleted may be referred to as a "disrupt" level of commitment. Thus, a "try" level of commitment is a lower level of commitment than the "disrupt" level. It will be noted that multiple levels of commitment may be implemented. In one embodiment, a user may allow deletion of snapshots that are locked by clones (a clone is a writable copy of a "parent" vvol) or restore processes (a "destroy level of commitment).

Settings may be provided to specify the condition to start the automatic deletion of backup data such as snapshots. For example, an administrator may configure autodelete to be triggered when the volume itself is near full (e.g., a certain percent full), when the space reserved in the volumes is near full, or when the space reserved specifically for backup data is near full. An administrator may also specify a condition when snapshot autodelete should stop (once started). In one embodiment, the condition may be a percentage of free space achieved.

Another configurable setting may include the order in which snapshots should be deleted by autodelete. For example, autodelete may be configured to delete the most recent or the least recent snapshots first.

Autodelete may be configured to defer deletion of a particular kind of snapshot to the end. For example, an administrator may choose that user-created snapshots are deleted fist and that snapshots created by the snapshot scheduler are deleted last or vise versa. An order in which snapshots are deleted may also be set based on the prefix of the name string of a snapshot.

Figure 4:
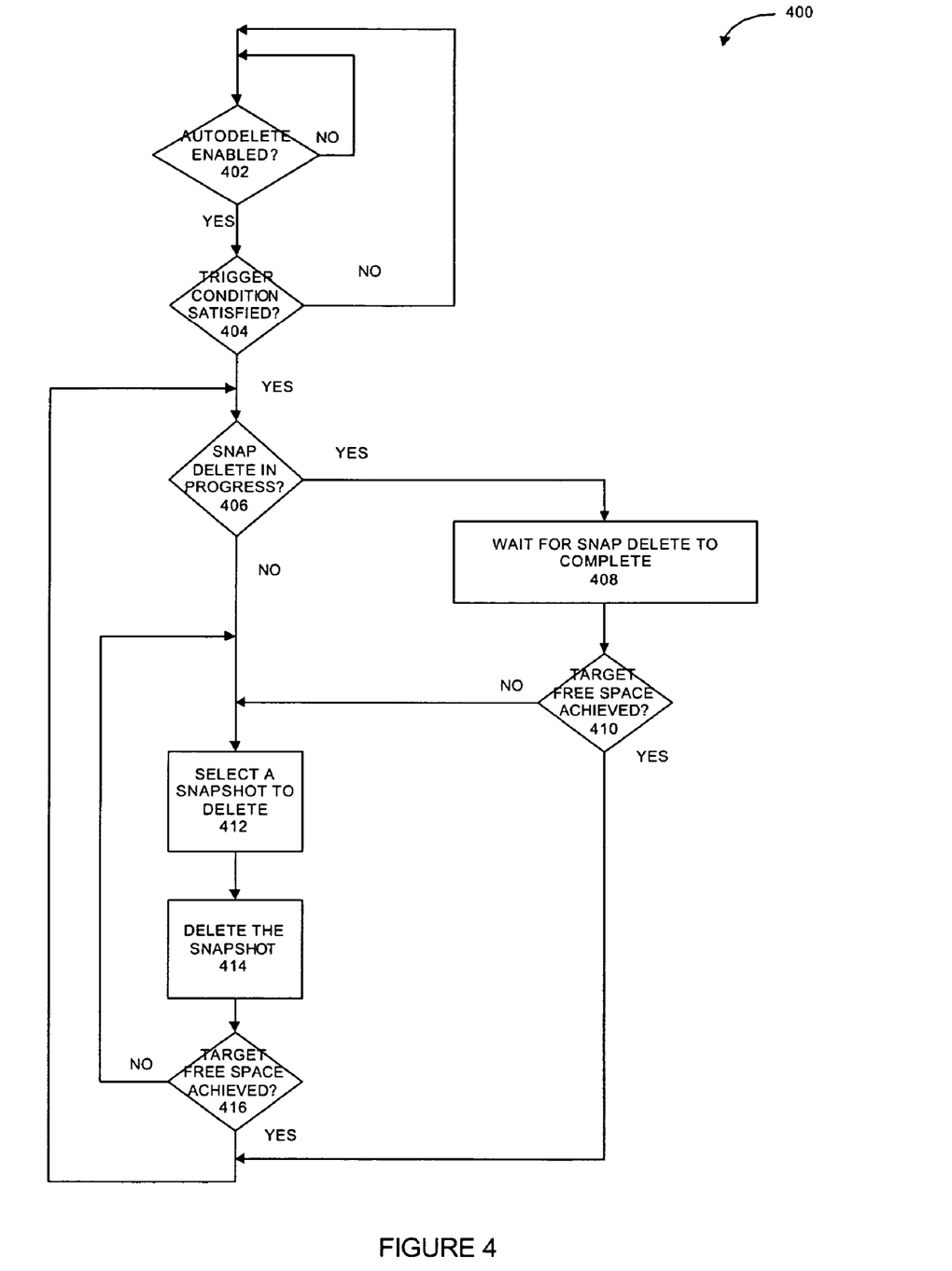
FIG. 4 is a flow chart illustrating a method to manage storage space utilizing an autodelete technique, according to one embodiment the present invention.

FIG. 4 is a flowchart of an illustrative method 400 to manage storage space utilizing autodelete functionality. Periodically (e.g., every 10 seconds) a kernel thread checks to see if there is a snap autodelete enabled on the volume (block 402). It then checks to see if the trigger condition is satisfied (block 404). In one embodiment, the trigger is set at 98% of trigger criteria specified by the administrator. If the trigger condition is satisfied, the method 400 verifies if there is already a process in progress that may be deleting some of the backup data such as a snapshot (block 406). In one embodiment, such process may be referred to as "snap delete" process. If there is a snap delete process in progress, the method 400 waits for that snap delete process to complete (block 408) before attempting to initiate an autodelete. If the target free space has not been achieved (block 410), the method 400 selects a snapshot that is appropriate for autodelete (block 412). The process scans the snapshots in the order specified by the user policy settings (e.g., starting with the most recent snapshots or with the least recent snapshots first).

In order to select an appropriate snapshot to be automatically deleted, the method 400 begins the scanning of all snapshots associated with the volume with the lowest commitment level in effect. For example, if a snapshot is found that satisfies the "try" criteria and is not designated as a snapshot for which autodelete should be deferred, the snapshot is marked for deletion and is then deleted (block 416). If no snapshot is found that satisfies the "try" criteria, the list of snapshots is scanned again, but this time ignoring defer criteria. If the search is still unsuccessful, the scan is performed with the next higher level of commitment allowed by the administrator. This process is continued until a snapshot suitable for deletion is found or the highest level of commitment designated by the administrator has been reached.

Autodelete may be repeated until the target free space has been achieved (block 416).

Another space management technique that may be implemented in one embodiment of the present invention is a mechanism that allows a flexible volume to automatically grow in size. This feature may be referred to as autosize. This approach may be useful when a volume is about to run out of available space but there is space available in the containing aggregate for the volume to grow. In one embodiment, autosize is disabled by default so that an administrator needs to explicitly enable autosize, e.g., utilizing an associated CLI command or a graphical user interface (GUI). The autosize policy may be set on a per volume basis.

A system administrator may specify the maximum size to which a flexible volume will be allowed to grow. When autosize operation is performed, the size of the volume is increased by the increment size specified with by the administrator. In one embodiment, a volume will not automatically grow (the size of the volume is not automatically increased) if the current size of the volume is greater than or equal to the maximum size specified by the administrator.

Figure 5:
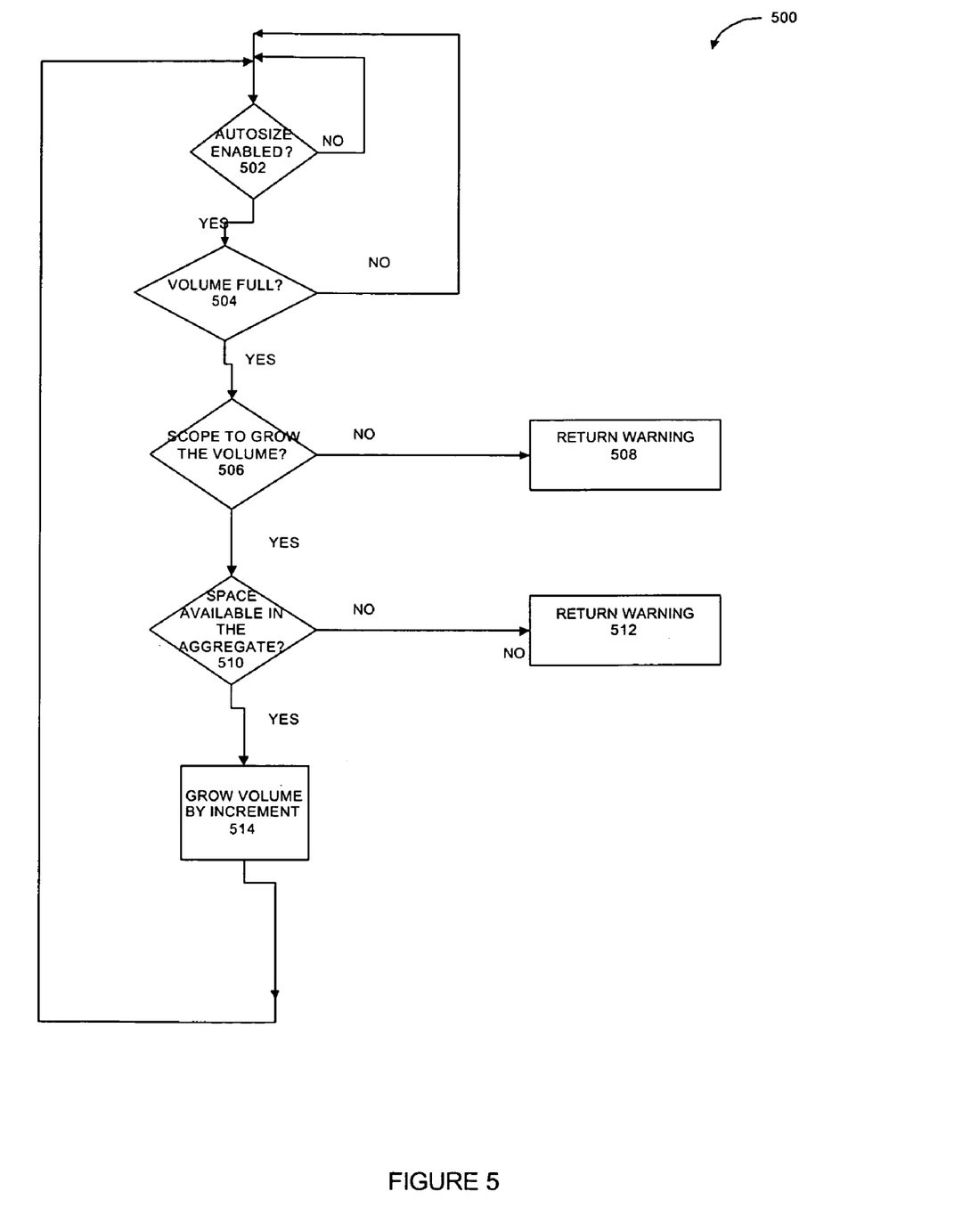
FIG. 5 is a flow chart illustrating a method to manage storage space utilizing an autosize technique, according to one embodiment the present invention.

FIG. 5 is a flowchart of an illustrative method 500 to manage storage space utilizing autosize functionality. Periodically (e.g., every 10 sec) a kernel thread checks to see if there is a snap autosize enabled on the volume (block 502). It then checks to see if the trigger condition (e.g., indicating that the volume is full) is satisfied (block 504). The trigger condition is determined, in one embodiment, based on the trigger criteria specified by the administrator. For example, the trigger criteria set by the administrator may be "volume 90% full." The trigger condition, on the other hand, may be set at a value below the trigger criteria specified by the administrator (e.g., at 98% of trigger criteria). If the trigger condition is satisfied, the method 500 verifies if there is scope to increase the size of the volume within the maximum size specified by the administrator (block 506). If there is not enough scope to increase the size of the volume (e.g., if the volume is already approaching the maximum size), a warning is returned to the user (block 508).

If there is enough scope, the method proceeds to block 510, where it is determined whether the aggregate has enough space to allow the growth. If there is enough space in the aggregate to allow growth, the volume is grown (block 514), otherwise a warning message is returned to the user (block 516).

It will be noted that, in some embodiments, autosize feature may be used to reduce the size of the volume when there is excess free space.

In one embodiment, multiple space management techniques may be implemented (e.g., an administrator is permitted to set both autodelete and autosize functionalities set on a volume). An administrator may then also be permitted to specify a preference of which technique is to be used first when the volume is about to run out of space (a user preference). A default preference may also be available.

It will be understood by those skilled in the art that the inventive technique described herein may apply to any type of special-purpose (e.g., file server, filer or multi-protocol storage appliance) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Thus, a method and system to manage storage space in a storage system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

It will be noted that the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A method to automatically manage storage space, the method comprising:
    storing, by a storage system, a plurality of volumes, wherein each volume has an autodelete policy and an autosize policy that are disabled and the policies are operable to be enabled for individual volumes;
    configuring, by the storage system, the autodelete policy and the autosize policy for the plurality of volumes, wherein the autodelete policy and the autosize policy for a volume are not dependent on the autodelete policies and the autosize policies for other volumes in the plurality of volumes, and wherein configuring the autodelete policy and the autosize policy for an individual volume comprises
        enabling one of the autodelete policy and the autosize policy as a first policy for the individual volume, and
        enabling the other of the autodelete policy and the autosize policy as a second policy for the individual volume;
    configuring a trigger value for the first policy and a trigger value for the second policy for each of the individual volume, wherein the trigger value for the first policy and the trigger value for the second policy for the individual volume are not dependent on the trigger values for first policies and second policies for other volumes in the plurality of volumes;
    determining that the trigger value for a first policy for the individual volume is reached;
    automatically initiating the first policy for the individual volume;
    determining that the first policy for the individual volume fails to reclaim a target amount of free space in the individual volume;
    automatically initiating the second policy for the individual volume in response to determining that the first policy for the individual volume fails to reclaim a target amount of free space; and
    notifying a user if the second policy for the individual volume fails to reclaim a target amount of free space in the individual volume.

2. The method of claim 1, wherein the autodelete function comprises deleting selected backup data in the individual volume.

3. The method of claim 1, wherein the autosize function comprises automatically increasing available space inside the individual volume.

4. The method of claim 1, wherein the one of the autodelete policy and the autosize policy is set as the first policy based on a user preference.

5. A method to manage storage space, the method comprising:
    storing, by a storage system, a plurality of volumes, where each volume has an autodelete policy and an autosize policy that are disabled and the policies are operable to be enabled for individual volumes;
    enabling, by the storage system, an autodelete function as a first automatic storage management policy for one of the plurality of storage volumes and an autosize function as a second automatic storage management policy for the particular storage volume, wherein the autodelete function and the autosize function for the particular storage volume are not dependent on autodelete functions and autosize functions for other storage volumes in the plurality of storage volumes;
    automatically detecting that a trigger condition for the autodelete function for the particular storage volume is met;
    automatically identifying a snapshot, which is inside the particular storage volume, to be deleted, in response to detecting that the trigger condition corresponding to the autodelete function is met, the identification to achieve a free storage threshold set for the particular storage volume, wherein the free storage threshold corresponds to the particular storage volume;
    automatically initiating the first automatic storage management policy for deleting the identified snapshot;

determining that deleting the identified snapshot fails to achieve the free storage threshold that corresponds to the particular storage volume;

automatically initiating the autosize function for the particular storage volume in response to determining that initiating the first automatic storage management policy on the particular storage volume fails to achieve the free storage threshold that corresponds to the particular storage volume; and notifying a user if the autosize function for the particular volume fails to reclaim a target amount of free space in the particular volume.

6. The method of claim 5, wherein the identifying of the snapshot inside the particular storage volume comprises identifying the snapshot according to commitment level criteria for the snapshot.

7. The method of claim 5, wherein the identifying of the snapshot inside the particular storage volume is performed after determining that no backup data is in the process of being deleted.

8. The method of claim 5, wherein the free storage threshold is a percent value of storage space available in the storage volume.

9. The method of claim 5, wherein the trigger condition is associated with a percentage of the free storage threshold.

10. The method of claim 5, wherein the storage volume is a flexible volume.

11. The method of claim 5, wherein the storage volume is a traditional volume.

12. A system to automatically manage storage space, the system comprising:

a repository to store backup data as a plurality of volumes, where each volume has an autodelete policy and an autosize policy that are disabled and the policies are operable to be enabled for individual volumes;

a processor, coupled to the repository through a bus and further coupled to a memory, wherein the processor executes instructions from the memory that cause the processor to enable an autodelete function as a first automatic storage management policy for one of the plurality of storage volumes and an autosize function as a second automatic storage management policy for the particular storage volume, wherein the autodelete function and the autosize function for the particular storage volume are not dependent on autodelete functions and autosize functions for other storage volumes in the plurality of storage volumes;

to automatically detect that a trigger condition corresponding to the autodelete function for the particular storage volume;

to automatically identify a snapshot, which is inside the particular storage volume, to be deleted, in response to detecting that the trigger condition corresponding to the autodelete function is met, the identification to achieve a free storage threshold set for the particular storage volume, wherein the free storage threshold corresponds to the particular storage volume;

to automatically initiate the first automatic storage management policy to delete the snapshot;

to determine that deleting the snapshot fails to achieve the free storage threshold that corresponds to the particular storage volume;

to automatically initiate the autosize function for the particular storage volume in response to determining that initiating the first automatic storage management policy on the particular storage volume fails to achieve the free storage threshold that corresponds to the particular storage volume; and to notify a user if the autosize function for the particular volume fails to reclaim a target amount of free space in the particular volume.

13. The system of claim 12, wherein the instructions further cause the processor to apply commitment level criteria the snapshot in order to identify the snapshot to be deleted.

14. The system of claim 12, wherein the instructions further cause the processor to identify the snapshot to be deleted responsive to a determination that no backup data is in the process of being deleted.

15. The system of claim 12, wherein the instructions further cause the processor to determine whether a target storage space that corresponds to the particular storage volume has been achieved responsive to the deleting of the identified snapshot.

16. The method of claim 2, wherein the selected backup data is selected according to commitment level criteria for the selected backup data.

17. The method of claim 2, wherein deleting the selected backup data is performed after determining that no backup data is in the process of being deleted.

18. The method of claim 6, wherein the commitment level criteria comprise multiple levels of commitment for the snapshot.

* * * * *